United States Patent [19]

Boger et al.

[11] 3,768,080

[45] Oct. 23, 1973

[54] DEVICE FOR ADDRESS TRANSLATION

[75] Inventors: Klaus Boger, Ehningen; Hellmuth R. Geng, Schoenaich; Volkmar Gotze; Johann Hajdu, both of Boeblingen, all of Germany

[73] Assignee: International Business Machines Corporation, Armonk, N.Y.

[22] Filed: Jan. 20, 1972

[21] Appl. No.: 219,359

[30] Foreign Application Priority Data

July 31, 1971 Germany.................. P 21 34 816.3

[52] U.S. Cl. ............................................ 340/172.5
[51] Int. Cl. ............................................ G11c 7/00
[58] Field of Search ................................ 340/172.5

[56] References Cited

UNITED STATES PATENTS

| | | | |
|---|---|---|---|
| 3,569,938 | 3/1971 | Eden et al. | 340/172.5 |
| 3,469,241 | 9/1969 | Barton et al. | 340/172.5 |
| 3,505,647 | 4/1970 | Torfeh et al. | 340/172.5 |
| 3,444,525 | 5/1969 | Barlow et al. | 340/172.5 |
| 3,541,529 | 11/1970 | Nelson | 340/172.5 |
| 3,614,746 | 10/1971 | Klinkhamer et al. | 340/172.5 |
| 3,599,176 | 8/1971 | Cordero, Jr. et al. | 340/172.5 |

*Primary Examiner*—Gareth D. Shaw
*Attorney*—John C. Black et al.

[57] ABSTRACT

In a microprogrammed processor, a pair of register means and an associative store are arranged to eliminate the need to translate, for each microinstruction, a logical address to a real address to access main storage. Translation is required only once for each program or machine level (macro) instruction. The real addresses of the first bytes of the current instruction and its operand(s) are stored in a first one of the register means and are normally incremented to access the remainder of the instruction and operands byte-by-byte. In addition, the first register means and incrementer can be used to access sequentially stored instructions in a program sequence without address translation. When a page boundary is crossed during said incrementing, the logical page address of the current instruction or operand (which is at the boundary) is read from the second register means and is incremented to form the logical address of the next sequential page. This new logical address is searched in the associative array. If a match occurs, the new logical address is stored in the second register means, and the corresponding real address is stored in the first register means. This hardware translate means significantly reduces translate time.

6 Claims, 2 Drawing Figures

DEVICE FOR ADDRESS TRANSLATION

BACKGROUND OF THE INVENTION

In multi-processor systems, multi-access systems, etc., a multitude of problem programs have to be processed by a data processing system. In most cases, the main storage of the data processing system is of a size insufficient for receiving all these programs concurrently. For that reason, the method now frequently followed is to store the problem programs in an external storage, e.g., on a disc storage, and to load only a few of these programs into the main storage of the data processing system at any one time. The necessary consequence thereof is that data is exchanged frequently between the main storage and the external storage of the system. If, to give an example, the execution of a program is interrupted, this program, for space reasons, must be relocated from main storage into the external storage; and a new program is loaded into the main storage.

This process is called dynamic storage relocation. Preferably, the programs are divided into segments and the segments into pages in this process. Thus, a data page containing e.g., 2,048 bytes is relocated as the smallest data block. In order to facilitate programming, it is advisable to apply symbolic addresses to the segments and pages. These can also be called logical addresses. Prior to each addressing of the main storage, and upon the use of such logic addresses, a translation of these logical addresses into the real main storage address is necessary. For this purpose, tables are used which can be stored in the main storage of the data processing system.

Additionally, it has turned out advantageous to keep available in registers the translated real address for a few logical addresses, e.g., those which had been used most recently. Upon each address translation, these registers are first interrogated; and should one of these registers already contain the real address corresponding to the offered logical address, main storage accesses are thus rendered superfluous, thus reducing translation time.

Such devices for address translation are known, to give an example, from U.S. Pat. No. 3,504,349 and from the article by Gibson, "Time Sharing in the IBM System/360, Model 67," in Proceedings Spring-Joint Computer Conference 1966, pages 61–78.

SUMMARY OF THE INVENTION

In microprogrammed data processing systems where multiple byte operands are processed a byte at a time, however, even the translation of the addresses in these external registers can beam an unnecessary loss of time. When micro-instructions access each byte, the logical address of the byte must be translated by the address translation device, and the resulting real address is loaded into the storage address register of the main storage. During the processing of two operand bytes of different operands, succeeding bytes of the two operands are alternatingly addressed. The real byte address of a first operand to be accessed is therefore written over by the real byte address of the second operand to be accessed in the storage address register. Since each succeeding operand byte to be accessed is part of a different operand and stored at separated locations in main store, the formation of consecutive access addressing cannot be achieved merely by incrementing the previous address in the main storage address register. To obtain each subsequent real byte address increased by one, the logic address is translated again and again by the external registers.

The invention relates to a device for translating external, logical addresses of data segments divided into pages into internal and real main storage addresses, in data processing systems with complete translation tables in the main storage and with a high-speed translating device with part tables outside the main storage, and with a modifier for modifying the respective main storage address for the next storage access.

It is the object of the present invention to design the device for address translation in such a manner that upon byte-wise processing the time required for translating each logical byte address is reduced.

According to the invention, this object is solved by a buffer storage for storing the real addresses which are used during the respective instruction processed, said storage being connected at the input to the high-speed translating device and at the output to the modifier and the main storage address register.

Therefore, as long as operands or instructions are processed with the same logical address, and as long as the byte address only is changed, access to the high-speed translating device can be avoided as in the buffer storage as disclosed by the invention the respectively processed real addresses are always available.

An advantageous embodiment of the invention is characterized by storage devices for storing the logical addresses used during the respectively processed instructions, and by a further modifier increasing the logical addresses in the storage devices by one, these increased addresses which by means of the high-speed translation device have been translated into real addresses being subsequently read into the buffer storage as soon as the modifier indicates by an overflow that a page boundary has been crossed.

The other modifier increments the logic addresses stored in these storage devices by one upon each operation, so that the subsequent logic address is simultaneously available for storage in the storage device and for translation into the respective real address, when the modifier, upon the increase of the respective byte address, indicates the exceeding of a page limit. It should be noted in that connection that the logical addresses of the segments and pages occur in numerical order, but that the corresponding pages in the main storage can be found in discretionary storage blocks which are not necessarily adjacent.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings.

DESCRIPTION OF THE PREFERRED EMBODIMENT

Figure 1:
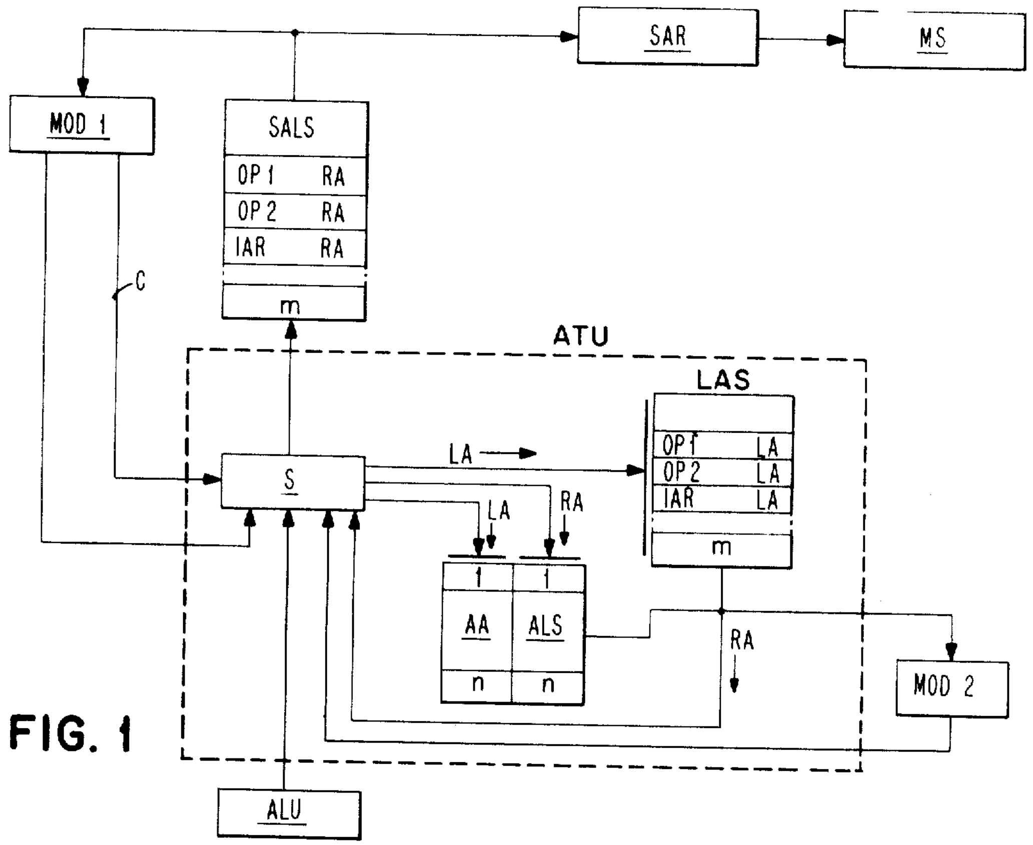
FIG. 1 is the address translation device according to the present invention.

In FIG. 1, it is assumed that the various circuits are microprogram controlled in a conventional manner and need not be described in detail.

FIG. 1 shows means whereby a logical address offered by the arithmetic unit ALU is first translated by a high-speed translation device ATU into a real address, which real address is subsequently stored in a buffer storage SALS. Then, this real address is presented to a main storage address register SAR for addressing a main storage MS. High speed translation devices such as ATU are described in greater detail in the above-mentioned Gibson article and in U. S. Pat. Nos. 3,412,382 and 3,533,075.

The translation device ATU consists of a switch S (under microprogram control) which first supplies the offered logical address LA to a table AA. The switch S can take any one of many suitable forms, for example, a register or group of latches having microprogram controlled input gates (i.e. AND/OR circuits) and output gates. An example of such a switch is shown in FIG. 2*c* of U. S. Pat. No. 3,651,475. Thus an address can be gated into S alternatively from the unit ALU, either modifier MOD 1 or MOD 2 or from the storage LAS under control of the microprogram. This address is gated from the switch S alternatively to the buffer storage SALS, the storage LAS, or the associative store tables AA and ALS in accordance with the microprogram. The switch S can also be in the form of an assembler such as that shown in U. S. Pat. Nos. 3,500,337 and 3,504,349. This table AA is preferably in the form of an associative storage and stores *n* (e.g., 8) logical addresses which are at present used, or have recently been used. Examples of a suitable associative store are shown in U. S. Pat. Nos. 3,708,788; 3,230,512 and 3,518,631. Should the offered logical address LA and a logical address stored in table AA correspond, the corresponding real address is read out of the corresponding real storage location in a second table ALS in the associative storage, and applied to buffer storage SALS via switch S. This real address can then be read into storage address register SAR when desired to address the main storage MS. In operations referring to one single operand only, e.g., also to the reading-out of an instruction from main storage MS, the logical address for the first byte of this operand only has to be translated into the real address. The following real byte addresses are obtained via a modifier MOD1 by an increase by one. Upon word-wise or semiwordwise processing, modifier MOD1 can of course equally execute an increase by 2 or 4. MOD 1 can be a conventional simplified binary adder or accumulator in which a constant value 1, 2 or 4 is added to an input address value. Alternatively, the modifier MOD 1 can be generally of the subunit accessing and modifier type shown in U. S. Pat. No. 3,500,337.

In operations with e.g. two operands participating, the respective real addresses of different operands are in the main storage address register SAR during consecutive accesses. Without the use of the buffer storage SALS, therefore, an increase of these real addresses by modifier MOD1 by one would be meaningless because in the subsequent storage access the real address of the other operand would be read in. By means of buffer storage SALS, it is now possible to store the addresses which have been increased by one and to use them in the next respective storage access.

Therefore, the tables AA, ALS in the translation device ATU need be used only for the first-used byte address of an operand. In the following cycles of the bytewise processing of the operand, access to these tables is no longer necessary; and therefore, time is saved upon each micro-instruction. The time required in one embodiment for a main storage cycle is 240 ns, and that required for the address translation in the high-speed translation unit ATU is 80 ns, whereby the apparatus allows the saving of a significant amount of processor time. Eliminating the need for translation, in those instances when consecutive addressing can be achieved by the buffer storage SALS and the modifier MOD1, can also save considerable processing time.

In the buffer storage SALS, three locations are provided for storing the real addresses for instruction address register IAR, the first operand OP1, and the second operand OP2. Upon other program instructions, e.g., upon multi-address instructions, a correspondingly higher number of storage locations m can be provided in buffer storage SALS.

Consequently, there applies the general rule that buffer storage SALS is of advantage for operations with operand change, i.e., also upon program instructions in which the instruction word itself and an operand are concerned.

Upon passing to the next instruction in a program sequence, the logical address of this next instruction is not used; instead, the real address in buffer storage SALS can simply be increased by means of modifier MOD1. Of course, this advantage does not apply to a jump (branch) instruction.

An important feature of the invention is the provision in the high-speed translation device ATU of a storage buffer LAS for storing the logical addresses of pages (e.g., segment, page values) corresponding to the real addresses in buffer storage SALS. Another modifier MOD2 is provided which during each microinstruction relating to a storage operation increases by one of the respective logical address from the additional storage LAS. However, the respective old logical address remains stored in storage LAS, and no use is normally made of the incremented logical address. Generally, the logical addresses are selected in such a manner that in the virtual overall storage, e.g., in the external disc storage, they indicate adjacent pages by logical addresses, the numerical values of which differ by one (i.e., segment, page values). Therefore, the increase by one of a logical address thus characterizes the respective adjacent page. If now, by an overflow signal on line C, modifier MOD1 indicates that a page boundary has been crossed, switch S is controlled and, owing to the incrementation process in modifier MOD2, the logical address of the next adjacent page is available at the output of MOD2, simultaneously and without loss of time, to be applied via switch S to table AA and to be stored in storage LAS. That is, the overflow signal on line C gates the output of MOD 2 into LAS and to the input of table AA via switch S. If this logical address which has been increased by one is already in table AA, the real address of the adjacent page is available in table ALS, and is transferred (without a main storage access) via switch S into buffer storage SALS. The overflow signal on line C from modifier MOD1 is simply generated in such a manner that, at a suitable location of the incrementation circuit, a carry signal is received. The number of bytes of a page can, e.g., be 2,048 or 4,096, and the carry signal originates in the next higher order bit position above the page value of 2,048 or 4,096.

The modifier MOD 2 is preferably a conventional binary adder which adds a binary 1 to the page number value to obtain the address value of the next page.

Figure 2:
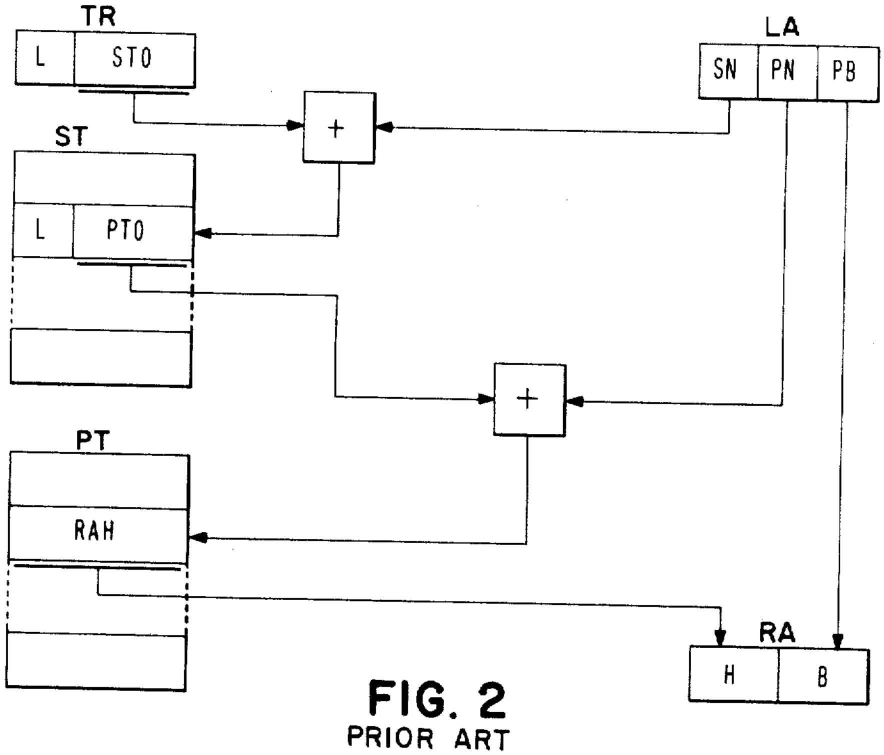
FIG. 2 PRIOR ART
FIG. 2 is the translation process which is executed in the main storage when out of a logical address the corresponding real address is obtained from the tables.

FIG. 2 shows the address translation process executed when the wanted real address is in main storage MS but not in the high-speed translation device ATU. The offered logical address LA consists of three parts: a logic segment part SN, a logic page part PN, and a real byte part PB. In the main storage, a table register TR is provided in which the starting address STO of a segment table is being stored. Logic segment part SN is added to this starting address, and a predetermined storage location in the segment table is addressed with the result thereof. This storage location contains the starting address PTO of a page table PT. Logic page part PN of logic address LA is added to this starting address PTO, and a predetermined storage location in the page table PT is addressed with the result thereof. This storage location contains the high order bits of real page address RAH. The low order bits of the wanted byte address are taken directly from byte part PB of logic address LA. The concatenated high order bits H and low order bits B then supply real byte address RA.

The logic segment and page parts SN and PN are then stored in storage AA and LAS of the high-speed translation device ATU (e.g., by way of the ALU and switch S). The associated real address parts H, B are stored (e.g. via the ALU and switch S) in the storage ALS and SALS in the high-speed translation device ATU.

The loading of the various logic and real addreses into storages AA, LAS, SALS and ALS is preferably performed in a known manner and therefore is not specified in greater detail.

While the invention has been particularly shown and described with reference to a preferred embodiment thereof, it will be understood by those skilled in the art that various changes in form and details may be made therein without departing from the spirit and scope of the invention.

What is claimed is:

1. In a data processing system of the type wherein logical page addresses are translated by means of main storage table look-up into real block addresses for accessing operands and instructions from main storage, wherein the most recently used ones of the logical page addresses and their corresponding real block addresses are stored in an associative storage for rapid translation on subsequent reuse, and wherein means including a first incrementer is normally effective for updating current real addresses to sequentially access instructions and operands or portions thereof from main storage for processing, in combination therewith a first register means for storing simultaneously the real addresses of the current instruction and its operands and adapted to supply said addresses for accessing main storage, means including said first incrementer effective for updating in word and sub-word address increments each address in the first register means after it is supplied for accessing main storage and for returning the updated address to the first register means, an additional register means for storing the logical page address corresponding to each real address in the first register means, and means effective, when the first register means supplies an address to access main storage which address is the last address in a block, for transferring the logical and real address of the next page and its corresponding block to the second and first register means respectively.

2. The combination set forth in claim 1 wherein the last-mentioned means comprises means in the first incrementer for producing a carry signal when a block boundary is crossed, means including a second incrementer for incrementing the logical page address of the additional register means during each main memory accesss, means effective only in response to a carry signal for searching the associative storage for a logical address equal in value to that of said incremented logical page address, and means responsive to a match during said search for storing the incremented logical page address in the additional register means and the corresponding real address in the first register means.

3. In a data processing system of the type wherein logical page addresses are translated by means of main storage table look-up into real block addresses for accessing operands and instructions from main storage, wherein the most recently used ones of the logical page addresses and their corresponding real block addresses are stored in an associative storage for rapid translation on subsequent reuse, and wherein means including an incrementer is normally effective for updating current real addresses to sequentially access instructions and operands from main storage for processing, in combination therewith a register means for storing simultaneously the real addresses of the current instruction and its operands and adapted to supply said addresses for accessing main storage, and said incrementer effective for updating each address in the register means as each address is supplied for accessing consecutive portions of each instruction operand without table look-up or associative store translation.

4. The combination set forth in claim 3 wherein the incrementer is rendered effective to update instruction addresses in the register means to access instructions in a program sequence without table look-up or associative store translation.

5. In a virtual memory data processing system wherein logical addresses supplied by a program are first translated to real addresses for accessing data operands and program instructions in a main storage portion of the system for processing, the combination comprising a first register means for storing simultaneously the real addresses of the current instruction and its operands and adapted to supply said addresses for accessing main storage, means including translation means for transferring into the register means the real addresses of a first instruction in a sequence and its operands, and a first modifier circuit thereafter effective for incrementing the address value of each real address in the first register means in response to the real address being supplied to the main storage address register to access an operand or instruction, thereby forming a sequence of real addresses without further translation.

6. The combination set forth in claim 5 further comprising an associative storage means for storing a group of most recently used logical addresses and their corresponding real addresses, an additional register means for storing the logical page address corresponding to each real address in the first register means, means for reading out and incrementing each logical page address from the additional register means when its corresponding real address is supplied from the first register means, means in the first modifier circuit responsive to the crossing of a page boundary in an address supplied from the first register means for searching the associative storage means for a logical page address corresponding to the incremented logical page address, and means responsive to a match in the associative storage means for storing the incremented logical page address and its corresponding real address in the additional and first register means respectively.

* * * * *